United States Patent
Kwon et al.

(10) Patent No.: US 7,138,600 B2
(45) Date of Patent: Nov. 21, 2006

(54) AUTOMATIC PULSE PLASMA WELDING METHOD AND APPARATUS FOR FORMING LAP JOINT BETWEEN MEMBRANE SHEETS

(75) Inventors: Oh-Jong Kwon, Ulsan-Si (KR);
Hyung-Shik Kim, Ulsan-Si (KR);
Kyeong-Ju Kim, Ulsan-Si (KR);
Young-Jin Park, Ulsan-Si (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 395 days.

(21) Appl. No.: 10/839,263

(22) Filed: May 6, 2004

(65) Prior Publication Data

US 2005/0247680 A1    Nov. 10, 2005

(51) Int. Cl.
*B23K 10/00*    (2006.01)
(52) U.S. Cl. .......................... 219/121.46; 219/121.45; 219/121.56; 219/137 R
(58) Field of Classification Search ........... 219/121.45, 219/121.46, 121.54, 121.57, 121.59, 121.48, 219/137 R
See application file for complete search history.

(56) References Cited

U.S. PATENT DOCUMENTS 4,837,418 A * 6/1989 Modglin ................ 219/121.45
5,611,944 A * 3/1997 Gilkinson et al. ........ 219/117.1
6,249,718 B1 * 6/2001 Gilliland et al. ............ 700/255
6,772,040 B1 * 8/2004 Picard et al. ................ 700/166

\* cited by examiner

*Primary Examiner*—Mark Paschall
(74) *Attorney, Agent, or Firm*—Arent Fox PLLC (57) ABSTRACT

Disclosed herein is an automatic pulse plasma welding method and apparatus for forming a lap joint between membrane sheets, which applies plasma welding to a lap joint between membrane sheets to improve working efficiency and productivity, and which provides optimal welding conditions to the respective regions of the lap joint between membrane sheets to improve welding quality. In the present invention, each of corrugated parts of a lap joint between membrane sheets having flat parts and the corrugated parts is divided into a plurality of regions, optimal welding conditions are provided to each of the regions, a corrugated part is sensed by a photo sensor to improve sensitivities of two touch sensors, a θ axis of a welding torch moves by a difference value between outputs of the two touch sensors, the angle of the welding torch at each of the corrugated parts is recognized by output voltage values of a potentiometer mounted on the θ axis of the welding torch, and if a detection voltage corresponding to each of the regions is recognized, welding conditions of a corresponding region are varied/set to an optimal welding condition, thus enabling the lap joint between membrane sheets to be pulse plasma welded.

15 Claims, 6 Drawing Sheets

AUTOMATIC PULSE PLASMA WELDING METHOD AND APPARATUS FOR FORMING LAP JOINT BETWEEN MEMBRANE SHEETS

BACKGROUND OF THE INVENTION

1. Field of the Invention

The present invention relates generally to an automatic pulse plasma welding method and apparatus for forming a lap joint between membrane sheets, and more particularly to an automatic pulse plasma welding method and apparatus for forming a lap joint between membrane sheets, which can promptly form a lap joint between stainless steel membrane sheets that are arranged on the inner surface of a membrane-type liquefied natural gas storage tank and provided with horizontal and corrugated parts, using automatic plasma welding under optimal welding conditions.

2. Description of the Prior Art

Generally, welding is a method of joining two metal materials, that is, base metals, by heating the portions of the base metals to be melted or half-melted, or by fusing base metals together with a filler metal. Welding methods are classified into arc welding, gas welding, thermit welding, electroslag welding, electrobeam welding, etc. Arc welding is classified into a consumable arc welding method in which a working electrode is consumed and a non-consumable arc welding method in which a working electrode is not consumed, according to whether or not a working electrode is consumed. There are gas tungsten arc welding (GTAW) and plasma arc welding as representative non-consumable arc welding methods. Further, the non-consumable arc welding method may be classified into manual welding and automatic welding according to its unique properties and its purposes.

The gas tungsten arc welding is a method of joining base metals by using an inert gas, such as Ar, He, etc., as a shield gas and melting the base metals using arc heat created between a tungsten electrode, which is a non-consumable electrode, and the base metals. In this case, an additional filler metal can be provided and melted together with the base metals. Argon Ar or helium He which is an inert gas is used as the shield gas so as to prevent the base metals and the tungsten electrode from oxidizing, so the gas tungsten arc welding is also called tungsten inert gas (TIG) welding. This welding method can be applied to all welding positions, its arc is highly stable, and the quality of a weldment is excellent, so the welding method is used in welding of materials sensitive to oxidization and nitrification or welding requiring low heat input and high quality construction.

The plasma arc welding is a method using a powerful plasma jet, which is a special form of the TIG welding. In plasma arc welding, a plasma gas is additionally provided besides a shield gas, and a tungsten electrode is located within a water cooled contraction nozzle. Plasma arc welding is characterized in that the arc is contracted by the contraction nozzle to form a cylindrical shape, so the area of a part of the base metal to which arc heat is applied is constant even though a distance between the nozzle and the base metal changes. Consequently, plasma arc welding is almost the same as TIG welding except that concentration of arc is improved by the contraction nozzle.

Further, since a true constant current power source always supplies a constant current during a welding operation, the value of the current does not change according to the length of the arc. Therefore, the true constant current power source can be profitably applied to the GTAW and the plasma arc welding in which the length of arc is restricted.

However, current variation is required so as to control the size of molten puddle and penetration, such that a mechanical device for supplying 2-stage current while continuously changing it is developed. In this case, since an outputted current has a pulsating wave, the current is called a pulse current. Such a pulse welding method is frequently used for out-of position welding or first layer welding of a single-sided weldment, because the pulse welding prevents a molten metal from flowing and consequently, it is highly advantageous to the progress of proper welding.

In the prior art, of the above welding methods, the TIG welding method is used for a lap joint between membrane sheets due to difficulties such as the construction of equipment, control, signal transmission, etc. However, the TIG welding method is problematic in that it is difficult to obtain satisfactory welding results because the lap joint between membrane sheets has straight parts and curved parts, an aiming direction of a welding torch continuously changes, in particular, at the curved parts, and there is a processing error or an assembly error generated during a fit-up operation.

Additionally, the TIG welding method is problematic in that a welding speed is lower than that of the plasma welding method, working efficiency is decreased due to the low welding speed, and welding defects are frequently generated at intersecting parts between flat parts and corrugated parts of membrane sheets, or inflection regions of the corrugated parts.

SUMMARY OF THE INVENTION

Accordingly, the present invention has been made keeping in mind the above problems occurring in the prior art, and an object of the present invention is to provide an automatic pulse plasma welding method and apparatus for forming a lap joint between membrane sheets, which applies plasma welding to a lap joint between membrane sheets to improve working efficiency and productivity, and which provides optimal welding conditions to the respective regions of the lap joint between membrane sheets to improve welding quality.

In order to accomplish the above object, the present invention provides an automatic pulse plasma welding method and apparatus for forming a lap joint between membrane sheets, in which each of corrugated parts of a lap joint between membrane sheets having flat parts and the corrugated parts is divided into a plurality of regions, optimal welding conditions are provided to each of the regions, a corrugated part is sensed by a photo sensor to improve sensitivities of two touch sensors, a $\theta$ axis of a welding torch moves by a difference value between outputs of the two touch sensors, the angle of the welding torch at each of the corrugated parts is recognized by output voltage values of a potentiometer mounted on the $\theta$ axis of the welding torch, and if a detection voltage corresponding to each of the regions is recognized, welding conditions of a corresponding region are varied/set to an optimal welding condition, thus enabling the lap joint between membrane sheets to be pulse plasma welded.

BRIEF DESCRIPTION OF THE DRAWINGS

The above and other objects, features and other advantages of the present invention will be more clearly understood from the following detailed description taken in conlap joint with the accompanying drawings, in which.

DESCRIPTION OF THE PREFERRED EMBODIMENTS

Hereinafter, embodiments of the present invention will be described in detail with reference to the attached drawings.

When a lap joint between membrane sheets having flat parts and corrugated parts is welded, an aiming direction of a welding torch changes, so different welding conditions must be applied according to regions of a weld line so as to obtain excellent welding quality. Especially, if the position of a welding torch is not correct or welding conditions are not optimal at a head part and a foot part of a corrugated part, desired weld beads are not generated, or welding defects are frequently generated due to excessive heat input or insufficient heat input. Therefore, a weld line of a membrane sheet is divided into a plurality of regions, and optimal welding conditions suitable for respective regions must be set.

Figure 1:
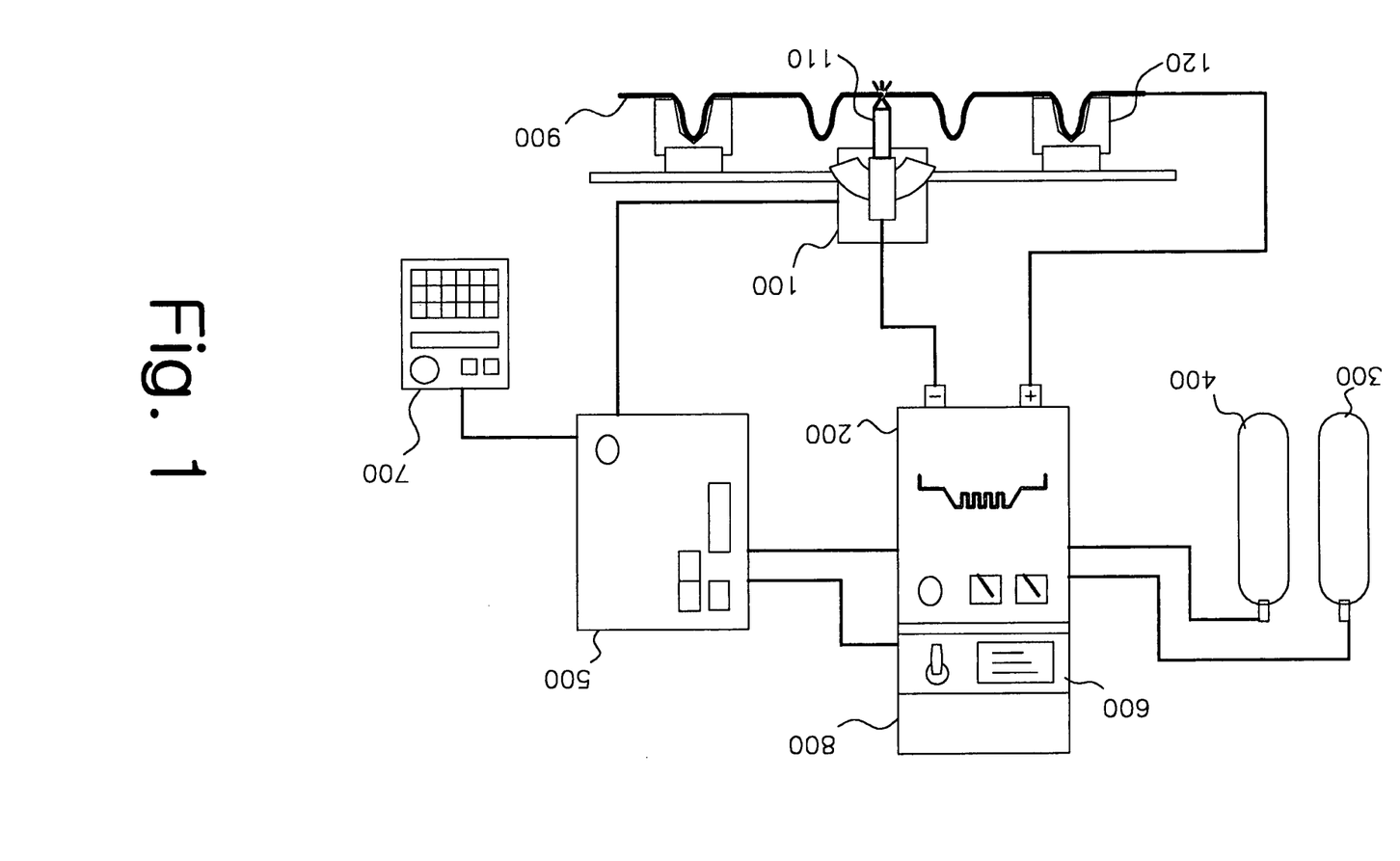
FIG. 1 is a view showing an example of entire construction of an automatic pulse plasma welding apparatus according to the present invention.
Figure 2:
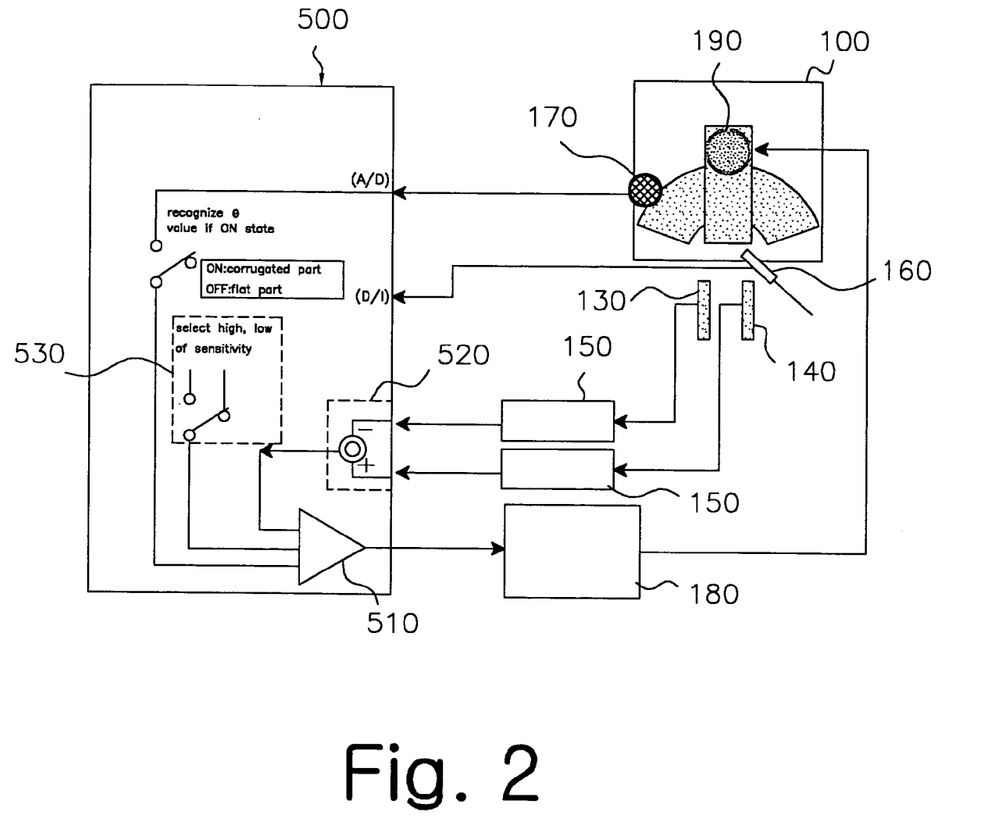
FIG. 2 is a view showing an example of a signal flow according to the present invention.
Figure 6:
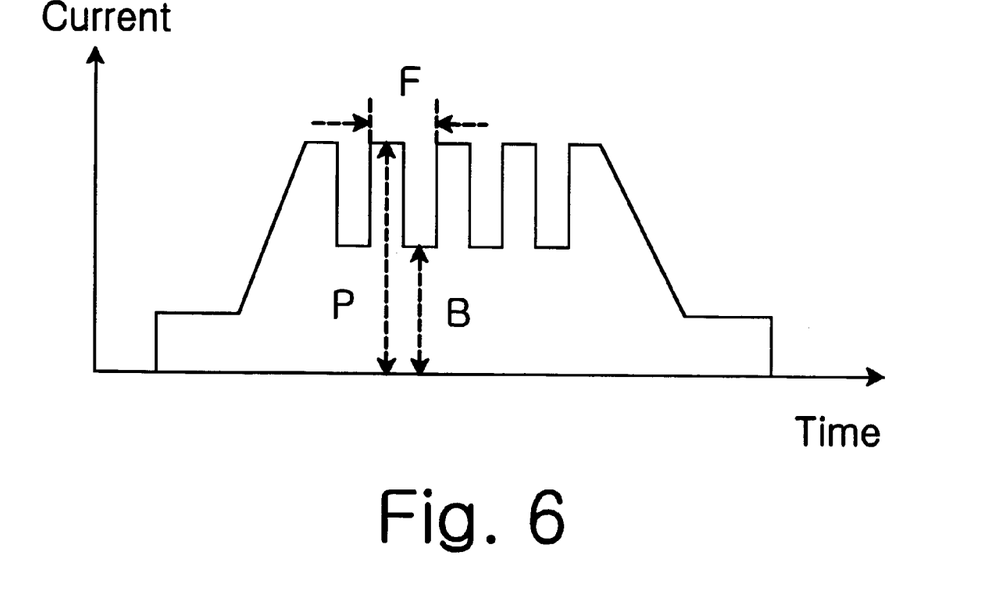
FIG. 6 is a view showing an example of a relationship between a pulse welding current and time according to the present invention.

FIG. 1 is a view showing an example of entire construction of an automatic pulse plasma welding apparatus according to the present invention, FIG. 2 is a view showing an example of a signal flow according to the present invention, and FIG. 6 is a view showing an example of a relationship between a pulse welding current and time according to the present invention. The present invention provides an apparatus for forming a lap joint between membrane sheets by a pulse plasma welding method, and comprises a carriage 100, a guide rail 120, a plasma welding machine 200, a plasma gas storage unit 300, a shield gas storage unit 400, a controller unit 500, an interface unit 600, a remote controller unit 700 and a touch screen unit 800. The carriage 100 serves to move a welding torch 110, and the guide rail 120 serves to allow the carriage 100 to move thereon. The plasma welding machine 200 supplies welding power to the welding torch 110. The plasma gas storage unit 300 and the shield gas storage unit 400 are connected to the plasma welding machine 200 and the welding torch 110. The controller unit 500 is connected to both the plasma welding machine 200 and the carriage 100. The interface unit 600, the remote controller unit 700 and the touch screen unit 800 are connected to the controller unit 500.

The carriage 100, to which the welding torch 110 is fixed, moves forwardly and backwardly along the guide rail 120. Further, two touch sensors 130 and 140, a photo sensor 160 and a potentiometer 170 are mounted on the carriage 100 to recognize the condition of weld parts. The carriage 100 moves while controlling an angle of the welding torch 110.

The welding torch 110 is mounted on the carriage 100 to move forwardly and backwardly along a weld line in the direction of the X axis, which is a travel direction, move upwardly and downwardly by a Y axis slider, and move left and right on the basis of the weld line by a Z axis slider.

Further, the welding torch 110 is constructed such that its moving angle to the weld part 900 (hereinafter, referred to as "θ axis") is varied to be perpendicular to the contour of the weld part 900 by a torch angle adjusting motor 190 controlled by a welding torch angle adjusting driver 180.

The plasma welding machine 200 has functions of outputting a pulse current, separately controlling a shield gas and a plasma gas and cooling the torch.

The touch screen unit 800 performs functions of setting, in detail, welding conditions varied according to respective regions, and storing and displaying data. Further, the touch screen unit 800 is schematically constructed to set shapes of weld regions and welding conditions according to the regions.

The controller unit 500 is implemented by a programmable logic controller (PLC) and comprised of a part for recognizing the position of a weld part, a part for controlling an output of the welding machine 200 so as to output welding conditions inputted by the touch screen unit 800, and a part for controlling the carriage 110 which supports the welding torch 110 and moves along the weld line.

The touch screen unit 800 and the controller unit 500 exchange welding conditions with each other through a communication unit. The controller unit 500 outputs an instruction signal to the welding machine to output welding conditions received through the touch screen unit 800 and additionally controls the carriage 100.

Figure 7:
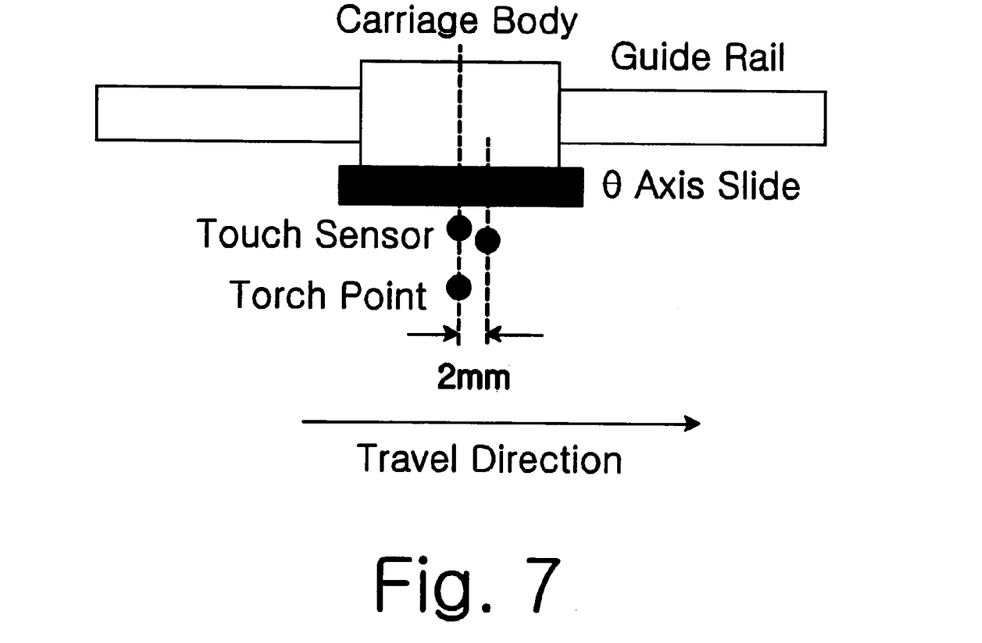
FIG. 7 is a schematic diagram of a carriage on which touch sensors are mounted according to the present invention.

The two touch sensors 130 and 140 connected to and mounted on the carriage 100 come into contact with a lap joint (weld part) between membrane sheets to perform sensing operations. The touch sensors 130 and 140 are arranged to precede the welding torch 110 in the travel direction of the carriage 100, and mounted to be collinear with the welding torch 110 in the travel direction (X axis) of the carriage 100, as shown in FIG. 7. Further, the two touch sensors 130 and 140 are spaced apart from each other by about 1 to 5 mm such that one touch sensor 140 precedes, and the other touch sensor 130 follows the touch sensor 140. In this case, the following touch sensor 130 is a sensor to recognize the height of the welding torch, and the preceding touch sensor 140 is a torch angle recognizing sensor to recognize a current angle of the welding torch by comparing output values of the touch sensors 130 and 140 with each other.

That is, the contour condition of the lap joint (weld part) between membrane sheets is sensed by the two touch sensors 130 and 140. Detection signals outputted from the touch sensors 130 and 140 are inputted to the controller unit 500, so the controller unit 500 controls the welding torch angle adjusting driver 180 to operate the torch angle adjusting motor 190.

The photo sensor 160 is mounted on the carriage 100 so as to detect a point preceding by about 10 to 15 mm a contact point of the preceding touch sensor 140 and the lap joint (weld part) between membrane sheets. Accordingly, the photo sensor 160 detects a position where the lap joint between membrane sheets changes from a flat part 910 to a corrugated part 920. The photo sensor 160 is a non-touch sensor, and has an output value varied according to a distance between the photo sensor 160 and the weld part. That is, if the carriage 100 moves on the flat part 910 of the lap joint between membrane sheets, a distance between the sensor 160 and the weld part is not changed, so a measured value is an "OFF" state (flat part recognition state). Further, if the carriage 100 moves on the flat part 910 of the lap joint between membrane sheets and approaches the corrugated part 920, a distance between the sensor 160 and the weld part becomes shorter, so a measured value is an "ON" state (corrugated part recognition state).

As described above, a corrugated part detection signal detected by the photo sensor 160 is inputted to the controller unit 500. The controller unit 500 can control sensitivities of the two touch sensors 130 and 140 in response to the detection signal from the photo sensor 160. That is, if the corrugated part 920 is detected by the photo sensor 160, the corrugated part detection signal is transmitted to the controller unit 500, and the controller unit 500 selects the sensitivities of the touch sensors 130 and 140 as "high" and increases the sensitivities in response to the corrugated part detection signal. Further, if the flat part 910 is detected by the photo sensor 160, the flat part detection signal is transmitted to the controller unit 500, and the controller unit 500 selects the sensitivities of the touch sensors 130 and 140 as "low" and decreases the sensitivities in response to the flat part detection signal.

The sensitivities are used to improve detection ability of the touch sensors. If the sensitivities are set to "high", a time interval for detecting a contour condition of the lap joint between membrane sheets by the touch sensors (time interval for detecting difference values between outputs of two touch sensors) is shortened. Further, the detected signal is promptly processed (by increasing a gain of an instruction signal inputted to the torch angle adjusting motor), such that signal transmission to the welding torch angle adjusting driver 180 is promptly carried out. Therefore, if the lap joint changes from the flat part 910 to the corrugated part 920, the rotation of the welding torch 110 can be promptly and easily performed.

Further, if the sensitivities are set to "low", a time interval for detecting a difference value between outputs of the two touch sensors is set to be lengthened such that a speed and a time interval for detecting the contour condition of the lap joint (weld part) between membrane sheets by the touch sensors are further increased compared to a case where the sensitivities are set to "high". Further, a gain of an instruction signal inputted to the torch angle adjusting motor is set to be decreased, so unnecessary detecting operations are removed during a welding operation for the flat part 910, thus enabling the welding operation to be easily performed.

The potentiometer 170 measures the rotation angle of the welding torch 110 rotated by the welding torch angle adjusting driver 180 and the torch angle adjusting motor 190 through the operation of detecting the corrugated part 920 using the photo sensor 160. If the corrugated part 920 is detected by the photo sensor 160, the potentiometer 170 is operated by the controller unit 500 in response to the detection signal, such that the rotation angle of the welding torch 110 is recognized. The potentiometer 170 transmits a voltage value corresponding to the recognized rotation angle to a gate 510 of the controller unit 500.

That is, when the lap joint between membrane sheets is welded, the welding torch 110 must be maintained to be perpendicular to the weld part 900 except for a special case. Therefore, when the corrugated part of the lap joint between membrane sheets is welded, the corrugated part is divided into a plurality of regions and the angle of the welding torch 110 must be controlled according to respective regions so as to cause the welding torch 110 to be perpendicular to the weld part 900. In this case, the potentiometer 170 senses the rotation angle of the welding torch 110 and outputs a voltage value corresponding to the sensed rotation angle to the controller unit 500. The controller unit 500 compares the voltage value outputted from the potentiometer 170 with a voltage value preset according to each of the regions and varies welding conditions such that a corresponding region is welded under optimal welding conditions.

For example, it is assumed that the range of voltages outputted from the potentiometer 170 is set to 0 to 15 V, with the voltage being set to "0 V" when the θ axis of the welding torch fully moves to the left end of the weld part (when the welding torch is located at the left side, and the weld part is located at the right side), and the voltage is set to "15 V" when the θ axis of the welding torch fully moves to the right end of the weld part (when the welding torch is located at the right side and the weld part is located at the left side). In this case, 7V is detected while the flat part 910 is welded, while the detected voltage approaches "0V" at a nearby region of a foot part (a position changing from a flat part to a corrugated part). That is, since the weld part and the welding torch 110 must be perpendicular to each other, the welding torch 110 rotates to weld the foot part, so the welding torch 110 is laid down to the left by the rotation.

Further, if an ascending slope of the corrugated part 920 is welded, the voltage increases again, and 7V is detected again when the welding torch 110 approaches the top (peak) of the corrugated part. Further, as the welding torch 110 gradually descends along the corrugated part 920, the voltage increases, such that almost 15V is detected at a nearby region of a foot part (a position changing from a corrugated part to a flat part). At this time, the welding torch 110 is almost laid down to the right. Further, the welding torch 110 welds the foot part while rotating, so the output voltage of the potentiometer 170 decreases. If the welding torch 110 welds the flat part 910 again, the output voltage of the potentiometer 170 decreases from 15V and is maintained at 7V.

As described above, in the present invention, detection signals detected by the two touch sensors 130 and 140 are amplified through respective amplifiers 150 and inputted to the controller unit 500. The amplified signals are converted into digital signals by an analog/digital converter 520, and the digital signals are transmitted to the gate 510. Further, the detection signal detected by the photo sensor 160 is inputted to the controller unit 500. The controller unit 500 controls the sensitivities of the touch sensors in response to the inputted detection signals through a sensitivity unit 530. Simultaneously, the potentiometer 170 measures the rotation angle of the welding torch 110. The controlled sensitivity values and the output voltage value of the potentiometer 170 are transmitted to the gate 510 of the controller unit 500.

As described above, if plural values including output values of the touch sensors, sensitivity high/low values, the value measured by the potentiometer, etc., are inputted to the gate 510, the gate 510 operates the welding torch angle adjusting driver 180 according to the inputted values to vary the rotation angle of the welding torch 110 mounted on the carriage 100, and to provide optimal welding conditions according to weld portions of the weld part.

In this case, each of the weld portions can be divided into a plurality of regions according to weld parts and welding conditions. A peak current P of a pulse current, a base current B, a pulse frequency F, a welding speed, etc. can be used as optimal welding condition variables according to the regions. The peak current P servers to heat and melt base metals, and influences weld penetration. The base current B serves to cool or solidify a melt pool. Further, the pulse frequency F influences the formation of regular weld bead grains over entire weld part. That is, at a place where a welding speed is high, the pulse frequency F is set to be high, while at a place where a welding speed is low, the pulse frequency F is set to be low. Therefore, although the welding speed is varied on the whole, the weld bead grains are maintained at regular intervals. Further, welding conditions according to regions are realized by using the touch screen. Shapes and welding conditions according to weld regions are schematically set and stored in the touch screen, so a user can conveniently utilize the welding apparatus.

Further, a method of realizing the above-described welding conditions recognizes the corrugated part 920 through the potentiometer 170, and controls an instruction signal transmitted to the welding machine unit 200 from the controller unit 500 such that welding conditions are varied at a position where the output of the potentiometer 170 corresponding to a desired region is generated.

In this case, the ranges of applied welding conditions are set as follows: in the flat part 910, the range of a peak current is 70 to 80 A, the range of a base current is 8 to 20 A and the range of a pulse frequency is 2 to 5 Hz, and in the corrugated part 920, the range of a peak current is 35 to 50 A, the range of a base current is 8 to 15 A and the range of a pulse frequency is 1.5 to 4 Hz.

Figure 3:
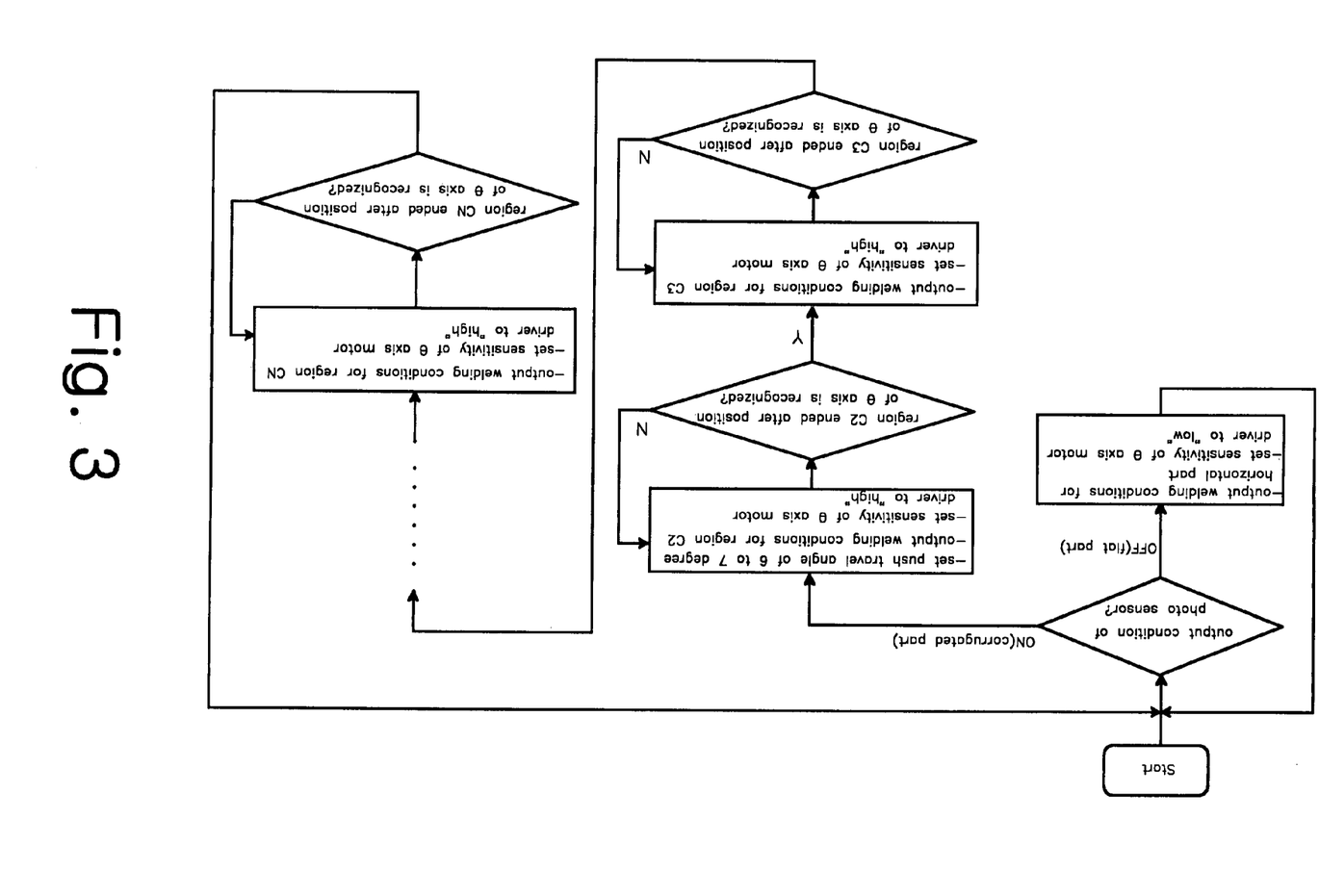
FIG. 3 is a flowchart showing a process of recognizing horizontal and corrugated parts and dividing each of a corrugated part into regions according to the present invention.
Figure 4:
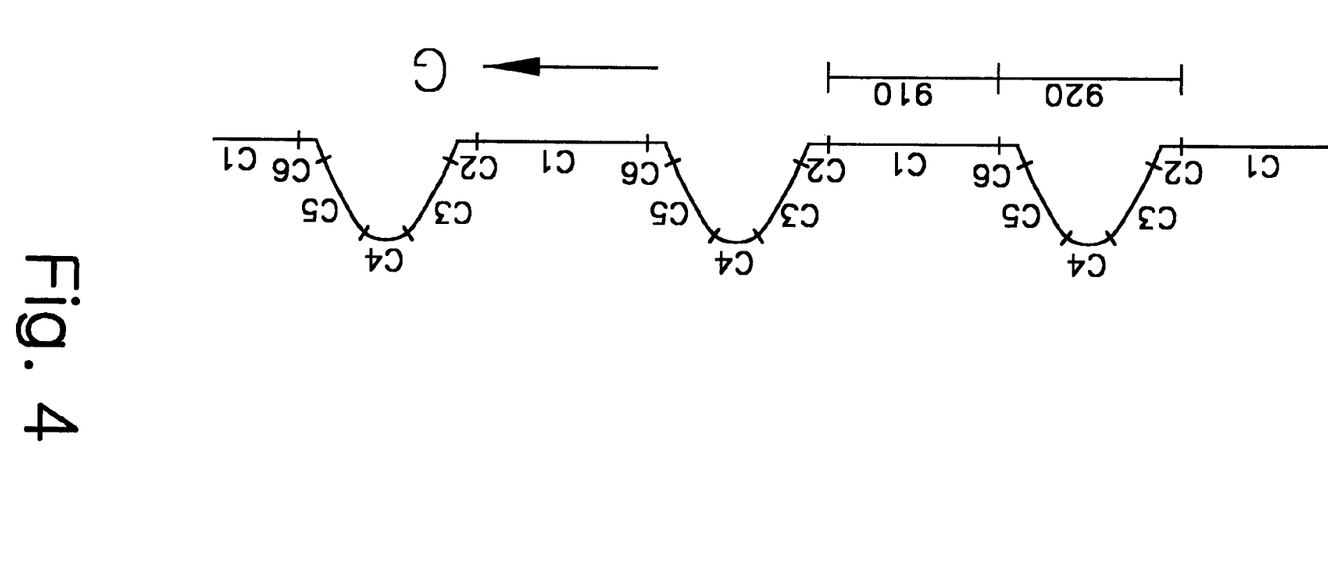
FIG. 4 is a view showing an example of a membrane sheet which is divided into regions according to the present invention.
Figure 5:
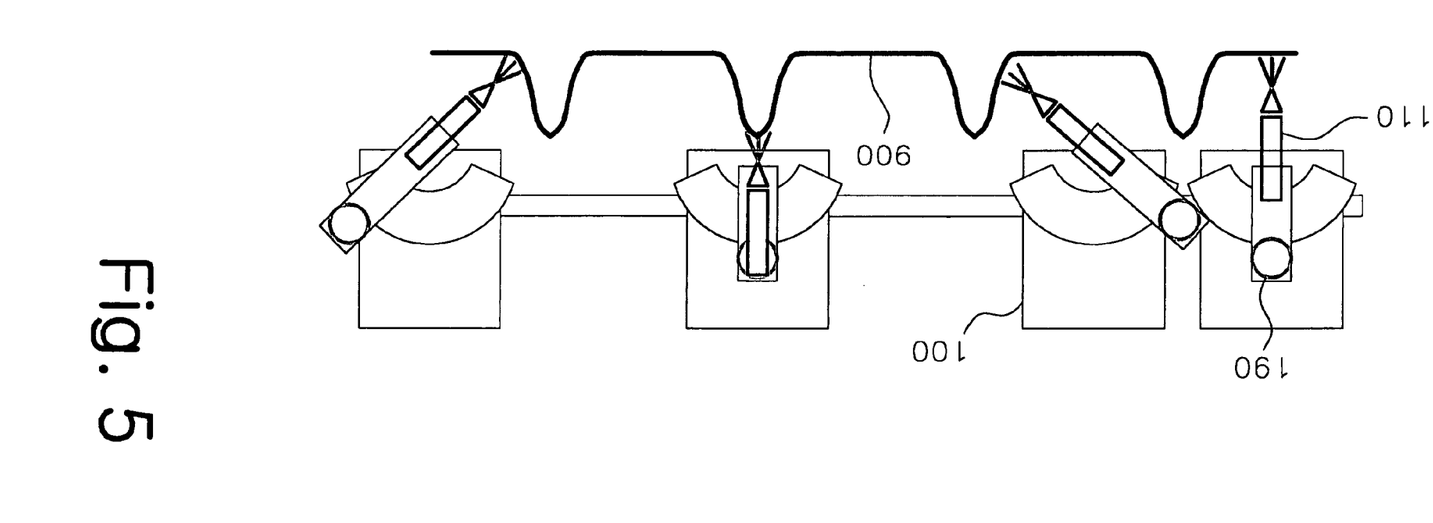
FIG. 5 is a view showing an example of the operation of the present invention.

FIG. 3 is a flowchart showing a process of recognizing horizontal and corrugated parts and dividing each of a corrugated part into regions according to the present invention, FIG. 4 is a view showing an example of a membrane sheet which is divided into regions according to the present invention, and FIG. 5 is a view showing an example of the operation of the present invention. Referring to FIGS. 3 to 5, there is little angle variation of the welding torch 110 at the flat part 910, so a sampling time for error detection can be increased by reducing the sensitivities of the two touch sensors 130 and 140 at the flat part 910, as described above. On the contrary, since welding conditions at the corrugated part 920 are different from those at the flat part 910, the corrugated part 920 must be distinguished from the flat part 910 in this sense, and the angle of the welding torch 110 must be controlled to correspond to the variation of bends.

As described above, in order to control the angle of the welding torch 110 to correspond to the variation of bends of the lap joint (weld part) between membrane sheets, the rotation angle of the welding torch 110 rotated by the welding torch angle adjusting driver 180 must be detected. The present invention is constructed such that the rotation angle of the welding torch 110 is detected by the potentiometer 170, and the detected rotation angle is transmitted to the gate 510. That is, the photo sensor 160, the two touch sensors 130 and 140 and the potentiometer 170 are mounted on the carriage 100 of the present invention, such that the potentiometer 170 is operated through an operation of sensing the corrugated part 920 by the photo sensor 160, and the rotation angle of the welding torch 110 is detected by the operation of the potentiometer 170.

Hereinafter, a weld part of the lap joint between membrane sheets is divided into six regions C1 to C6, as shown in FIG. 3, and welding operations for the regions will be described in detail on the basis of the following embodiments.

Embodiment 1

The welding torch 110 is moved by X, Y and Z axis sliders, and the two touch sensors 130 and 140 are mounted on portions of the carriage 100, on which the welding torch 110 is mounted and which moves forwardly and backwardly along the guide rail 120, that is, positions preceding the welding torch 110. Further, the photo sensor 160 is mounted on the carriage 100 to precede the touch sensors 130 and 140.

The guide rail 120 is installed on the lap joint (weld part) between membrane sheets, and the lap joint is welded along the weld line of the lap joint (weld part) between membrane sheets while the carriage 100 with the welding torch 110 mounted thereon is moved along the guide rail 120.

As the carriage 100 is moved along the weld line as described above, the photo sensor 160 detects a position preceding by about 10 mm the preceding touch sensor 140 of the two touch sensors 130 and 140 which are located in front of the welding torch 110. Further, the two touch sensors 130 and 140 detect a contour condition of the lap joint between membrane sheets by moving while being in contact with the contour of the lap joint.

In this case, if the welding torch 110 welds a flat part (region C1) of the lap joint between membrane sheets, there is little variation of the contour of the flat part (region C1), so a value detected by the photo sensor 160 is hardly varied. Further, there is no difference between output values of the preceding touch sensor 140 and the following touch sensor 130, or there is an extremely fine difference therebetween.

As described above, if a difference between output values of the touch sensors 130 and 140 does not exist, and no variation of the horizontal contour is detected by the photo sensor 160, the angle of the welding torch 110 is not varied. Further, since there is no corrugated part detection signal detected by the photo sensor 160, the rotation angle of the welding torch 110 is not measured by the potentiometer 170.

In the above case, since the flat part is welded, flat part welding conditions for increasing a used current and a welding speed are provided.

Embodiment 2

The welding torch 110 is moved by X, Y and Z axis sliders, and the two touch sensors 130 and 140 are mounted on portions of the carriage 100, on which the welding torch 110 is mounted and which moves forwardly and backwardly along the guide rail 120, that is, positions preceding the welding torch 110. Further, the photo sensor 160 is mounted on the carriage 100 to precede the touch sensors 130 and 140.

The guide rail 120 is installed on the corrugated part adjacent to lap joint between membrane sheets, and the lap joint is welded along the weld line of the lap joint between membrane sheets while the carriage 100 with the welding torch 110 mounted thereon is moved along the guide rail 120.

As the carriage 100 is moved along the weld line as described above, the photo sensor 160 detects a position (photo sensor point) preceding by about 10 mm the preceding touch sensor 140 of the two touch sensors 130 and 140 which are located in front of the welding torch 110. Further, the two touch sensors 130 and 140 detect a contour condition of the lap joint between membrane sheets by moving while being in contact with the lap joint.

In this case, if a position (region C2) where the lap joint between membrane sheets changes from the flat part 910 to the corrugated part 920 is detected by the photo sensor 160, the detection signal is inputted to the controller unit 500. Further, the potentiometer 170 is operated by the controller unit 500, and simultaneously the sensitivity unit 530 of the controller unit 500 is operated to switch the sensitivities of the touch sensors 130 and 140 from "low" to "high". The welding torch angle adjusting driver 180 is operated by the controller unit 500 so that the welding torch 110 is assigned a supplementary gradient having a forward angle of about 6 to 7 degrees with respect to a line perpendicular to the corrugated part 920 within the range of not influencing welding quality. At this time, the rotation of the supplementary gradient assigned to the welding torch 110 is detected by the potentiometer 170. The detection point of the photo sensor 160 is located 10 to 15 mm in front of the touch sensor 140, so corrugated part welding conditions are outputted from a position preceding an actual head part of the corrugated part 920 by 10 to 15 mm.

Embodiment 3

The welding torch 110 is moved by X, Y and Z axis sliders, and the two touch sensors 130 and 140 are mounted on portions of the carriage 100, on which the welding torch 110 is mounted and which moves forwardly and backwardly along the guide rail 120, that is, positions preceding the welding torch 110. Further, the photo sensor 160 is mounted on the carriage 100 to precede the touch sensors 130 and 140.

The guide rail 120 is installed on the lap joint between membrane sheets, and the lap joint is welded along the weld line of the lap joint between membrane sheets while the carriage 100 with the welding torch 110 mounted thereon is moved along the guide rail 120.

As the carriage 100 is moved along the weld line as described above, the photo sensor 160 detects a position preceding by about 10 mm the preceding touch sensor 140 of the two touch sensors 130 and 140 which are located in front of the welding torch 110. Further, the two touch sensors 130 and 140 detect a contour condition of the lap joint between membrane sheets by moving while being in contact with the lap joint.

In this case, the corrugated part (region C2) of the lap joint between membrane sheets is detected by the photo sensor 160, such that a supplementary gradient is assigned to the welding torch 110. If the two touch sensors reach the position (region C2) where the lap joint changes from the flat part 910 to the corrugated part 920, the welding torch angle adjusting driver 180 operates the torch angle adjusting motor 190 according to a difference between output values of the preceding touch sensor 140 and the following touch sensor 130, thus enabling the θ axis of the welding torch 110 to rotate left or right according to the varying positions (regions C2 and C6) and the corrugated part 920 (regions C3 to C5). The varied values of the θ axis are detected by the potentiometer 170 and inputted to the controller unit 500.

That is, if the welding torch 110 is moving upwardly (regions C2, C3 and C4) on the weld part, the output value of the touch sensor 140 becomes greater than that of the touch sensor 130, so a difference between the output values of the touch sensors 130 and 140 is positive, and the θ axis of the welding torch 110 rotates left. At this time, the potentiometer 170 has an output voltage value of 0 to 7 V, which is inputted to the controller unit 500.

Further, if the welding torch 110 is moving downwardly (regions C4, C5 and C6) on the weld part, the output value of the touch sensor 140 becomes less than that of the touch sensor 130, so a difference between the output values of the touch sensors 130 and 140 is negative, and the θ axis of the welding torch 110 rotates right. At this time, the potentiometer 170 has an output voltage value of 7 to 15 V, which is inputted to the controller unit 500.

As described above, if the output voltage value of the potentiometer 170 is inputted, the controller unit 500 detects regions C1 to C6 according to the output voltage value of the potentiometer 170, and provides optimal welding conditions corresponding to the respective regions to the welding torch.

Embodiment 4

The welding torch 110 is moved by X, Y and Z axis sliders, and the two touch sensors 130 and 140 are mounted on portions of the carriage 100, on which the welding torch 110 is mounted and which moves forwardly and backwardly along the guide rail 120, that is, positions preceding the welding torch 110. Further, the photo sensor 160 is mounted on the carriage 100 to precede the touch sensors 130 and 140.

The guide rail 120 is installed on the lap joint between membrane sheets, and the lap joint is welded along the weld line of the lap joint between membrane sheets while the carriage 100 with the welding torch 110 mounted thereon is moved along the guide rail 120.

As the carriage 100 is moved along the weld line as described above, the photo sensor 160 detects a position preceding by about 10 mm the preceding touch sensor 140 of the two touch sensors 130 and 140 which are located in front of the welding torch 110. Further, the two touch sensors 130 and 140 detect a contour condition of the lap joint between membrane sheets by moving while being in contact with the lap joint.

In this case, if the two touch sensors 130 and 140 enter the region C1 again after passing over the region C6, a difference between output values of the sensors 130 and 140 changes from "negative" to "0", which is detected by the potentiometer 170 and transmitted to the controller unit 500. The controller unit 500 recognizes a weld part as a flat part (region C1). That is, since a weld part is recognized as the flat part 910, the rotation angle of the welding torch 110 is not measured by the potentiometer 170, and the sensitivities of the two touch sensors 130 and 140 are changed from "high" to "low", as in the case of the embodiment 1.

As described above, in the present invention, if the output state of the photo sensor 160 is OFF (recognition of region C1), welding conditions for flat parts (increase a used current and a welding speed and intermittently detect the variation of the θ axis) are outputted, and the sensitivities of two touch sensors 130 and 140 are set to be "low". On the other hand, if the output state of the photo sensor 160 is ON (recognition of region C2), the welding torch 110 is moved at a forward angle of 6 to 7 degrees, and the sensitivities of the touch sensors are set to be "high" from "low".

Further, if the region C2 is detected through the difference between output values of the two touch sensors, and the rotation angle of the welding torch changes, the rotation angle of the welding torch is detected and recognized by the potentiometer 170. Thereafter, optimal welding conditions corresponding to the region C2 are provided, so the region C2 is welded under the optimal welding conditions.

If completion of the welding for the region C2 is detected by the potentiometer 170, welding conditions corresponding to the region C3 are outputted, such that the region C3 is successively automatically welded after the region C2. In this case, the sensitivities of the two touch sensors are maintained at "high".

As described above, if welding conditions corresponding to regions C3 to C6 are outputted by the detection of the potentiometer 170, and the welding for the corrugated part 920 is completed, welding operations are repeatedly performed again according to the output state (ON/OFF) of the photo sensor 160. Further, during the welding operations for regions C1 to C6, a weld part on which a welding operation currently progresses is displayed on the touch screen 800.

Further, the present invention may divide the corrugated part 920 into not six regions of C1 to C6 but a plurality of regions according to a bend degree of the weld part 900, thus enabling optimal welding conditions to be set. In this case, weld regions are also detected through an output value of the potentiometer 170, so optimal welding conditions can be are provided according to respective regions.

As described above, the present invention provides an automatic pulse plasma welding method and apparatus for forming a lap joint between membrane sheets, which detects positions where a lap joint between membrane sheets changes from a flat part to a corrugated part by a photo sensor, and improves sensitivities of touch sensors using the detected positions, thereby enabling the angle of a welding torch to be easily varied to correspond to the change from the flat part to the corrugated part.

Further, the present invention is advantageous in that, since a detection point of a photo sensor for detecting a corrugated part is set to detect a position preceding detection points of touch sensors by about 10 to 15 mm, welding conditions for a corrugated part are outputted from a position preceding by about 10 to 15 mm a position where the corrugated part actually starts, such that welding conditions can be easily varied according to the change from the flat part to the corrugated part, thus preventing welding defects generated in positions where a lap joint changes from the flat part to the corrugated part.

Further, the present invention is advantageous in that a welding torch is set to incline at a forward angle of 6 to 7 degrees with respect to a travel direction of the welding torch in response to a corrugated part detection signal detected by the photo sensor, thus enabling the momentum of the θ axis of the welding torch to be instantaneously reduced according to the variation of shapes of a weld part, and consequently allowing the welding torch to promptly correspond to the variation of the θ axis. Further, the present invention is advantageous in that it can prevent contact of a head part of the corrugated part with the welding torch, which is generated due to a high moving speed of the welding torch on the flat part, and welding defects generated by the contact.

Further, the present invention is advantageous in that it can easily detect positions where a lap joint between membrane sheets changes from a flat part to a corrugated part and easily recognize the corrugated part through a photo sensor, two touch sensors and a potentiometer mounted on a carriage, thus providing optimal welding conditions to corresponding regions, and consequently preventing welding quality from deteriorating due to non-uniformity of weld beads, welding defects, etc.

Further, the present invention is advantageous in that it controls various factors, such as a peak current of a pulse current, a base current, a pulse frequency and a welding speed, as welding condition variables according to regions, thus providing optimal welding conditions.

Further, the present invention is advantageous in that it can sense the rotation of the θ axis of the welding torch by an output voltage value of the potentiometer, such that the conditions of weld regions can be easily recognized, and optimal welding conditions can be simply varied according to respective regions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic pulse plasma welding method of forming a lap joint between membrane sheets, the method performing a pulse plasma welding operation by recognizing a flat part and a corrugated part of the lap joint between membrane sheets, through the steps of:

dividing a corrugated part of the lap joint between membrane sheets having at least one flat part and at least one corrugated part into a plurality of regions, and setting optimal welding conditions according to the regions;

installing a guide rail on the lap joint between membrane sheets, and welding a weld line for the flat part by moving a carriage along the flat part weld line by the guide rail;

detecting a position where the lap joint changes from the flat part to the corrugated part by a photo sensor mounted on a front portion of the carriage;

transmitting a corrugated part detection signal detected by the photo sensor to a controller unit;

changing sensitivities of two touch sensors to "high" from "low" by the controller unit in response to the corrugated part detection signal of the photo sensor, causing a welding torch mounted on the carriage to incline at a forward angle of 6 to 7 degrees with respect to a travel direction of the welding torch, and detecting a rotation angle of the welding torch by switching a potentiometer to an "ON" state;

recognizing the corrugated part of the lap joint between membrane sheets by the two touch sensors mounted to be collinear with the welding torch on the carriage in the travel direction (an X axis) of the welding torch;

rotating an θ axis of the welding torch to be perpendicular to a weld part by operating a torch angle adjusting motor through a welding torch angle adjusting driver in response to a difference between output values of the two touch sensors;

detecting the rotation of the θ axis of the welding torch by the potentiometer, and transmitting an output voltage value of the potentiometer corresponding to the detected result to the controller unit;

recognizing a corresponding region and varying welding conditions corresponding to the region if a voltage signal corresponding to each of the regions is detected according to the output voltage value of the potentiometer, which is transmitted to the controller unit; and recognizing the lap joint as the flat part on the basis of a position where the welding torch comes to have a right angle to a horizontal surface, and welding the flat part again.

2. The automatic pulse plasma welding method for forming a lap joint between membrane sheets according to claim 1, wherein the two touch sensors are a sensor for recognizing a height of the welding torch, and a torch angle recognizing sensor for recognizing a current angle of the welding torch, respectively, the torch angle recognizing sensor performing a detecting operation prior to the torch height recognizing sensor.

3. The automatic pulse plasma welding method for forming a lap joint between membrane sheets according to claim 1, wherein the sensitivities of "high" are set to decrease a time for detecting the difference between output values of the two touch sensors, and increase a gain of an instruction signal inputted to the torch angle adjusting motor, thus enabling the angle of the welding torch to promptly correspond to the variation of bends of the weld part.

4. The automatic pulse plasma welding method for forming a lap joint between membrane sheets according to claim 1, wherein the sensitivities of "low" are set to increase a time for detecting the difference between output values of the two touch sensors and decrease a gain of an instruction signal inputted to the torch angle adjusting motor.

5. The automatic pulse plasma welding method for forming a lap joint between membrane sheets according to claim 1, wherein the photo sensor has a detection point preceding by 10 to 15 mm a weld part detecting position of a preceding touch sensor of the two touch sensors.

6. The automatic pulse plasma welding method for forming a lap joint between membrane sheets according to claim 1, wherein the welding conditions are obtained by selecting one or more among groups comprised of a peak current of a pulse current, a base current, a pulse frequency and a welding speed.

7. The automatic pulse plasma welding method for forming a lap joint between membrane sheets according to claim 6, wherein the peak current of a pulse current is 70 to 80 A at the flat part and 35 to 50 A at the corrugated part.

8. The automatic pulse plasma welding method for forming a lap joint between membrane sheets according to claim 6, wherein the base current is 8 to 20 A at the flat part, and is 8 to 15 A at the corrugated part.

9. The automatic pulse plasma welding method for forming a lap joint between membrane sheets according to claim 6, wherein the pulse frequency is 2 to 5 Hz at the flat part, and is 1.5 to 4 Hz at the corrugated part.

10. The automatic pulse plasma welding method for forming a lap joint between membrane sheets according to claim 1, wherein detection signals detected by the two touch sensors are amplified by respective amplifiers, the amplified signals are inputted to the controller unit, and the inputted signals are converted into digital signals by an analog/digital converter and transmitted to a gate of the controller unit.

11. The automatic pulse plasma welding method for forming a lap joint between membrane sheets according to claim 10, wherein the gate of the controller unit receives the output voltage value of the potentiometer, the sensitivities of the two touch sensors and the difference between output values of the touch sensors, and outputs an instruction signal of the controller unit to the welding torch angle adjusting driver.

12. An automatic pulse plasma welding apparatus for forming a lap joint between membrane sheets, comprising:
 a carriage having a welding torch fixed thereto, moving forwardly and backwardly along a guide rail and having two touch sensors, a photo sensor and a potentiometer mounted thereon on said carriage to recognize a condition of a weld part;
 a plasma welding machine connected to the carriage for outputting a pulse current, separately controlling a shield gas and a plasma gas and cooling the welding torch;
 a shield gas storage unit connected to the plasma welding machine for storing the shield gas;
 a plasma gas storage unit connected to the plasma welding machine for storing the plasma gas;
 a controller unit connected to both the plasma welding machine and the carriage, implemented by a programmable logic controller (PLC) and comprised of a part for recognizing the position of a weld part, a part for controlling an output of the welding machine unit so as to output welding conditions inputted by a touch screen, and a part for controlling the carriage which supports the welding torch and moves along a weld line based on the recognized condition of the weld part;
 a touch screen connected to the controller unit through a communication unit for setting/storing welding conditions; and
 an interface unit.

13. The automatic pulse plasma welding apparatus for forming a lap joint between membrane sheets according to claim 12, wherein the welding torch moves forwardly and backwardly along the weld line in the direction of an X axis, which is a travel axes, moves upwardly and downwardly by a Y axis slider, moves left and right on the basis of the weld line by a Z axis slider, and has a θ axis varied by a torch angle adjusting motor controlled by a welding torch angle adjusting driver.

14. The automatic pulse plasma welding apparatus for forming a lap joint between membrane sheets according to claim 12 or 13, wherein the potentiometer is mounted on the θ axis of the welding torch.

15. The automatic pulse plasma welding apparatus for forming a lap joint between membrane sheets according to claim 12, wherein the photo sensor, the two touch sensors, and the welding torch are mounted in order on the carrier such that the photo sensor, the two touch sensors and the welding torch sequentially proceed along the weld line.

* * * * *